Dec. 26, 1961  E. H. MIDDENDORF ET AL  3,014,467
ENGINE TEMPERATURE REGULATING MEANS
Filed July 22, 1960  2 Sheets-Sheet 1
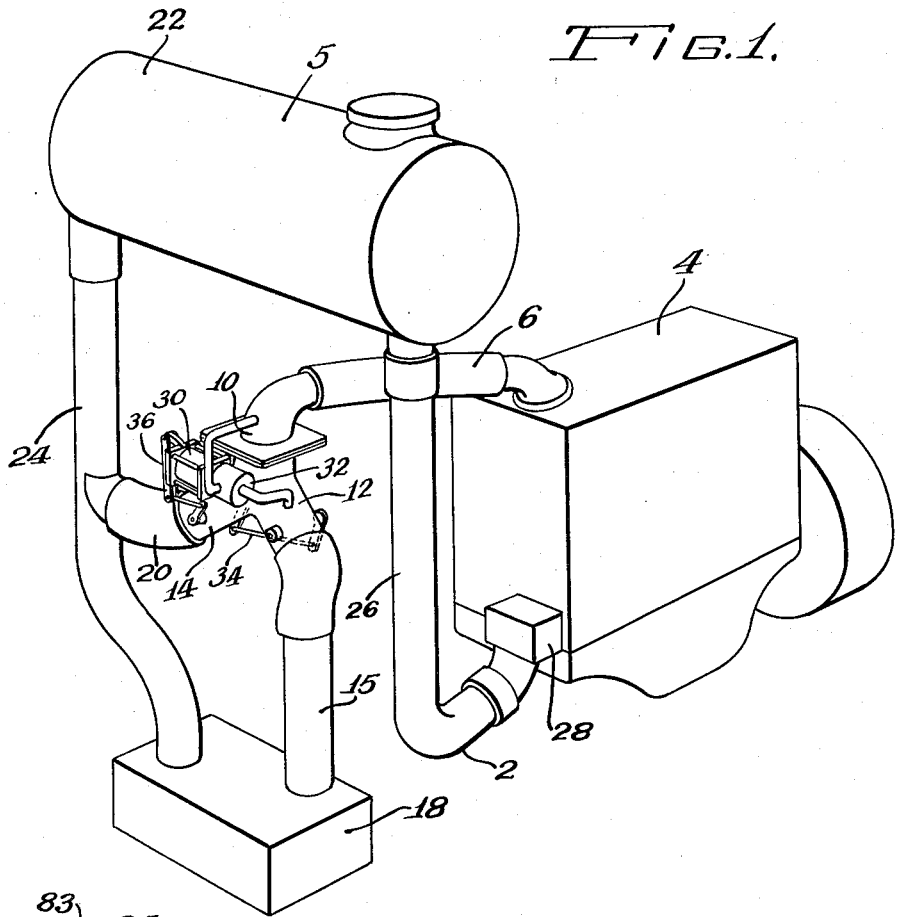
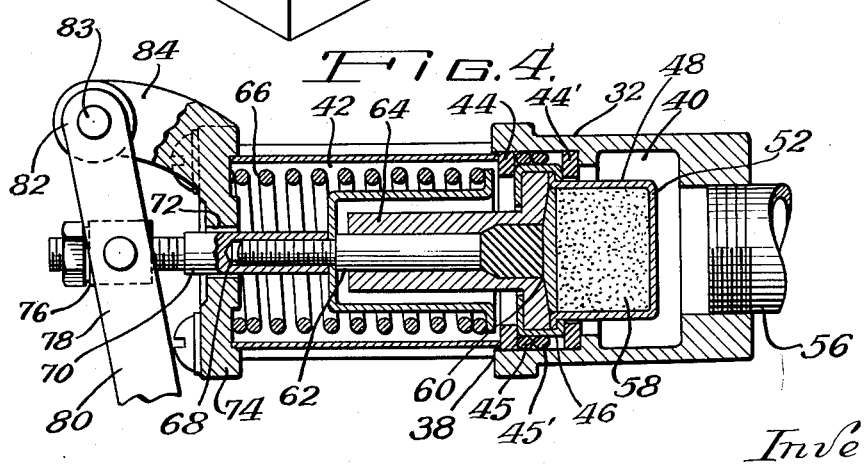
Inventors:
Eugene H. Middendorf
William C. Swanson
Robert S. Bowen
Paul O. Pippel Atty.

Dec. 26, 1961 E. H. MIDDENDORF ET AL 3,014,467
ENGINE TEMPERATURE REGULATING MEANS
Filed July 22, 1960 2 Sheets-Sheet 2
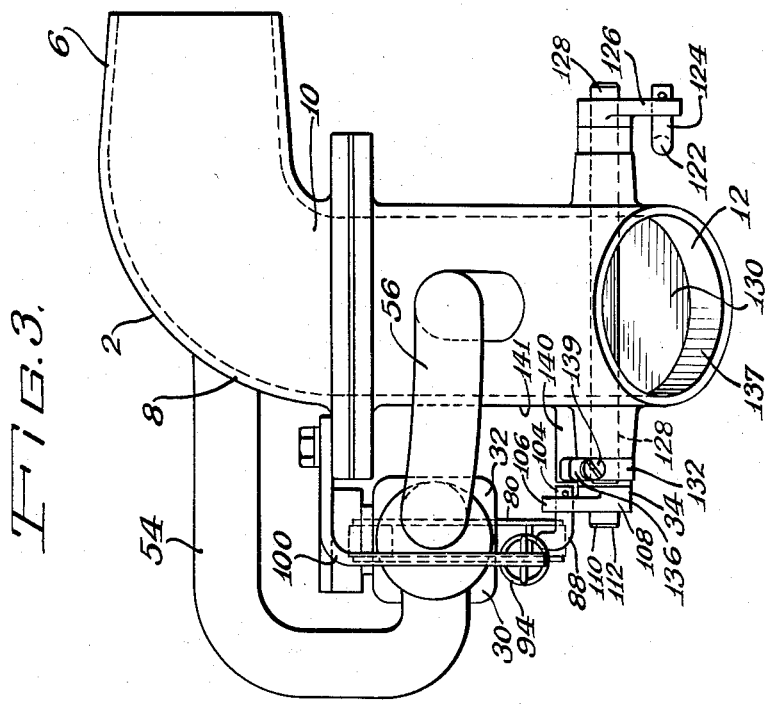
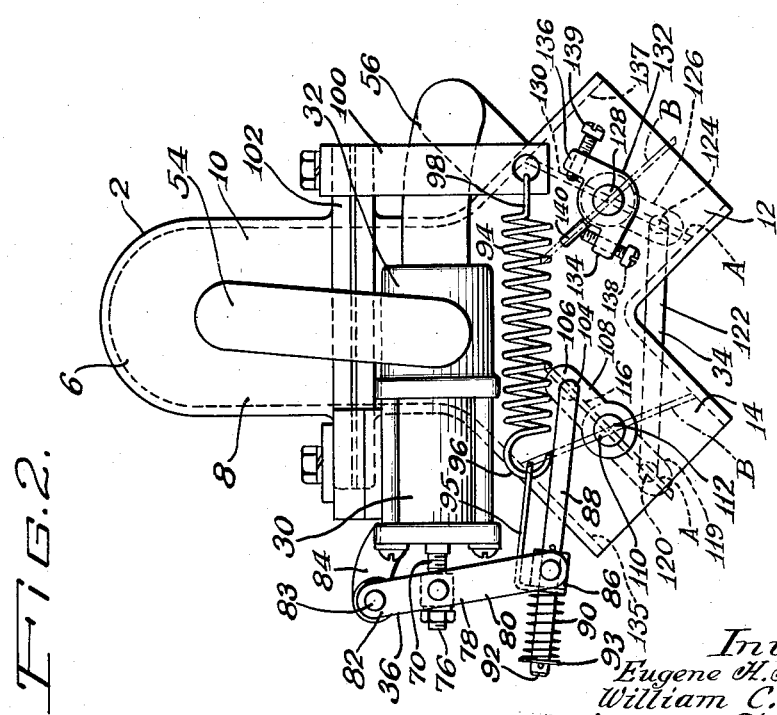
Inventors:
Eugene H. Middendorf
William C. Swanson
Robert S. Bowen
Paul O. Pippel
Atty.

United States Patent Office 3,014,467
Patented Dec. 26, 1961

3,014,467
ENGINE TEMPERATURE REGULATING MEANS
Eugene H. Middendorf, Glen Ellyn, William C. Swanson, Clarendon Hills, and Robert S. Bowen, Chicago, Ill., assignors to International Harvester Company, Chicago, Ill., a corporation of New Jersey
Filed July 22, 1960, Ser. No. 44,610
5 Claims. (Cl. 123—41.1)

This invention relates to means for regulating the temperature of an engine and in particular the temperature of a coolant system for an internal combustion engine.

It is therefore a general object of this invention to provide regulating means for controlling the temperature of an engine.

It is another object of this invention to provide a temperature regulating means for the cooling system of an internal combustion engine, which means includes a thermal responsive element and associated linkage external to the cooling system of the engine so as to be in unobstructing flow relation with respect to the engine coolant.

It is another object of this invention to provide an internal combustion engine coolant system providing a pair of coolant diverting valves operable simultaneously by an external thermal responsive means to allow cooling of the coolant for preventing overheating of the engine.

It is another object of this invention to provide a thermal responsive valve arrangement in the branched circuit of the cooling system where the thermostatic elements and valves are located external to the fluid conducting means but adjacent to the part of the conducting means having a zone of high heat for sensitive thermal response to temperature variations.

It is a further object of this invention to provide an engine coolant system with conduit means for diverting the coolant fluid to a heat exchanger for cooling or to bypass means for conducting the coolant directly back to the engine and thermostatic means external to the system responsive to changes in the coolant temperature for directing the coolant fluid accordingly.

It is another object to provide Y shaped conduit means housing valve means in each of two legs thereof, said valves being interconnected for synchronous action in response to an externally located thermostat for increasing the flow of the engine coolant to one of the valves and decreasing of the flow of the engine coolant to the other of said valves.

It is another object of this invention to provide a pair of valves in the branches of the fluid conducting means, each valve being spaced on equal distance from the juncture of the branches and conjunctively operable to variably proportionalize the total amount of coolant flow through each of the branches.

It is another object to provide an engine temperature regulating means as aforementioned providing a lost motion connection in the form of an overload resilient means between the thermal element and associated linkage for preventing damage to the valve mechanism beyond a predetermined operation of the element in response to temperature increase.

It is another object to provide abutment means to limit the angular displacement of the valve mechanism affording protection therefor.

These and other objects will become apparent from reference to the following drawings and subsequent description wherein:

FIGURE 1 is a diagrammatic view of the coolant fluid cooling system for preventing the overheating of the coolant fluid as it passes through its associated internal combustion engine;

FIGURE 2 is a sectional front elevational view of the novel temperature regulating means;

FIGURE 3 is a sectional side elevational view of a novel temperature regulating means shown in FIGURE 2; and FIGURE 4 is a sectional view taken along line 4—4 of FIGURE 3 and illustrating the construction of the thermostatic device used in the temperature regulating means.

Now directing interest to these drawings and in particular FIGURE 1 there is shown a cooling system or circuit 2 for an internal combustion engine 4, the circuit 2 comprising a cooling medium or fluid coolant 5 flowing from the engine 4 through the engine outlet holes or line 6 to a distribution inverted Y shaped portion or housing 8 having an entrance or main leg 10 and a pair of branch legs 12 and 14, the branch or coolant leg 12 leading to line 15 which is connected to a cooler or heat exchanger 18, and the branch or bypass leg 14 leading via line 20 to line 24 which empties the fluid coolant into a reservoir or expansion tank 22, the fluid conducting line 24 also connecting with the heat exchanger 18. A fluid line or engine inlet 26 connects the expansion tank 22 with the engine 4. A pump 28 between the fluid line 26 and the engine 4 draws the coolant 5 from the tank 22 and circulates it through the engine outlet 6 through the housing 8 to the cooler 18 or through bypass 20 directly back to the expansion tank 22. Now whether the fluid coolant 5 passes through the heat exchanger 18 or goes back directly to the engine 4 via the expansion tank 22 depends upon the temperature of the coolant within the engine and should such temperature of the engine coolant 5 rise above a certain predetermined value as a result of engine overheating, a temperature regulating device 30 housed in the vicinity of the portion 12 will direct the coolant 5 to the cooling source 18 before sending it back to the engine. The description of this novel temperature regulating device follows:

The temperature regulating device 30 comprises a thermal responsive means or thermostat 32, a valve mechanism 34, and external linkage 36 connecting the thermostat 32 to the dual valve arrangement 34, the thermostat 32 and the linkage 36 being external to the main flow of the coolant 5 in the cooling system 2.

The thermal responsive device 32 includes a housing structure 38 having a coolant chamber 40 separated from a piston chamber 42 by retaining washers 44, 44' and seal rings 45, 45', and shoulder 46 of the thermal power element 48 supported by and held between washers 44, 44' and rings 45, 45' in the housing 38. The element 48 has a cup portion 52 projecting into the chamber 40 which contains coolant 5 fed from small hoseline 54 from the main leg 10 of the Y housing 8 into chamber 40 and out through small hoseline 56 into coolant branch leg 12 of the portion 8. The cup portion 52 contains a thermal effected substance in the form of a wax pellet 58 which presses against a flexible diaphragm structure 60 of element 48 for movement of free piston structure 62 having its inner end 63 within guide member 64 projecting into chamber 42 and having its outer end 66 reciprocally receivable in bore 68 of rod or link 70 extending from chamber 42 outwardly of the housing 38 by way of opening 72 in wall 74 of the housing 38. The piston structure 62 and guide member 64 are surrounded by a spring assembly 65 of light rate seated within chamber 42 for merely holding the piston structure 62 in positive contact with the diaphragm structure 60 at all times. The rod 70 is movable outwardly of the housing 38 by piston structure 62 being acted upon by the expansion of pellet 58 upon an increase in temperature of coolant 5 and is pivotally connected at its end 76 outside housing 38 to the intermediate portion 78 of a link 80 having an upper end 82 pivotally connected at pivot 83 to an arm 84 fixedly held on the housing 38 and a lower end portion 86 slidably mounted on a rod 88 intermediate the ends thereof. The rod 88 has a spring 90 about its free end 92 between a retainer clip 93 and the lower end portion 86, the spring 90 being in its relaxed uncompressed position when the coolant 5 is being bypassed directly to the engine 4. The lower end portion 86 of the link 80 is urged in a counter-clockwise direction (as viewed in FIGURE 2) about pivot 83 by a spring 94 having an L shaped member 95 at its one end 96 connected with the portion 86 and the other end 98 attached to a depending strap 100 mounted on plate 102 secured about main leg 10 of Y shaped portion 8.

The rod 88 has its other end 104 pivotally connected to the upward projecting end 106 of link 108 of dual valve mechanism 34, the link 108 being connected to the front end 110 of shaft 112 and constrained for rotation therewith, the shaft 112 being journaled in the bypass leg 14 and passing therethrough. Within the hollow branch 14 is a bypass butterfly valve 116 carried on shaft 110 movable by link 108 to open and close positions for permitting or terminating coolant communication between the engine outlet 6 and the expansion tank 22. The back end of shaft 112 has fixed to it arm 119 which has pivotally connected to it one end 120 of a connector link 122 of the mechanism 34 and the other end 124 of the connector 122 is pivotally attached to depending portion 126 integral with the shaft 128 journaled on and housed in cooler branch leg 12, the shaft 128 carrying for rotation therewith a coolant butterfly valve 130 within leg 12 of housing 8 having opening and closing positions for permitting and terminating coolant communication between the engine outlet 6 and heat exchanger or cooler 18.

The butterfly valves 116, 130 are prevented from being damaged due to quick or intemperate closing of the valves against the insides 135, 137 of the respective housing branches 14, 12 by the employment of the set screw arrangement 132 mounted and constrained for rotation with the shaft 128 and comprising a pair of ears 134, 136 carrying adjustable set screws 138, 139 respectively and an abutment means or flange 140 mounted on the outside 141 of the housing branch 12, said abutment means 140 in conjunction with the adjustment of the screws 138, 139 limiting the extent of the angular movement of the valve 130 between close and open positions and consequently the extent of angular movement of valve 116 between close and open positions because of the movement of the connector link 122.

In operation the temperature regulating device 30 reacts to increases and decreases in the temperature of the coolant 5 heated by the engine 4 as follows:

An increase in temperature results in expansion of the wax pellet 58 which moves the diaphragm 60 and consequently the piston 62 against rod 70 to swing depending link 80 outwardly of the housing 38, as shown in dotted line in FIGURE 2, in a clockwise direction about pivot 83 and having its lower end 86 move to the left, as viewed in FIGURE 2, compressing spring 90 to move rod 88 to the left causing both butterfly shafts 112, 128 to rotate in a counterclockwise direction the same amount of degrees because of the common connector link 122 which moves the bypass valve 116 from the open position "A" in the direction of the closed position "B" and simultaneously to move the coolant valve 130 from the closed position "A" toward the fully opened position "B" shown in dotted line in FIGURE 2. Further increase in temperature when the valve 130 is in its fully opened position and the valve 116 is in its fully closed position results in further compression of spring 90 without movement or loading on the valves 116, 130 and therefore it is seen that the spring 90 acts as an overload spring to prevent damage to the butterfly linkage 36 and butterfly valves 116, 130 by movement of the thermal unit 32 only upon further increase in temperature. The extent of angular counterclockwise displacement or movement of these valves 116, 130 is directly proportional to the amount of increase of the temperature of the coolant 5, such displacement overcoming the action of the spring 94 wherein when the temperature relatively decreases the spring 94 will tend to return the bypass valve 116 to an open position and the heat exchanger valve 130 to a closed position.

It is to be noted that as the bypass valve 116 goes from completely opened to completed closed position the cooler valve 130 goes from completely closed to the completely opened position and vice-versa permitting all of the water from the engine outlet to be directed completely through the bypass leg 14 to the tank 22 for circulation to the engine 14, or to be partially directed through the bypass leg 14 to the tank 22 and partially directed through the cooler leg 12 to the heat exchanger 18, or to be completely directed through the coolant leg 12 to the heat exchanger 18 for cooling and then circulated back to the engine 4.

It is further to be noted that the valves 116, 130 are so positioned in the branches 14, 12 that each valve 116, 130 is located the same distance in its respective branch 14, 16 from the junction of the branches 12, 14 with the main leg 10 of the housing 8. Also the connector 122 permits each valve 116, 130 to open or close an increment equal to the corresponding closing and opening of the other valve 130, 116. The equality of location and angular movement of the valves 116, 130 results in a balanced variably proportionately divided coolant flow condition in each branch 12, 14 of the Y shaped housing 8 such that pump pressure of the coolant 5 is exerted equally on each valve 116, 130 regardless of valve position so that the only effective forces that act on the valves 116, 130 are those resulting from the action of the thermal responsive pellet 58 and the return spring 94.

To effect and further insure this balanced pressure and flow condition, the thermal responsive element 32 and associated linkage 36 is removed from the housing portion 8 or main flow of coolant 5 and presents no obstruction to the flow of the fluid through the coolant system 2 and yet the Y shaped housing 8 provides a zone of high heat concentration enveloping the thermostatic device 32 for more sensitive thermal responsive action. Also, expansion or contraction movements of the thermal responsive medium or wax pellet 58 are removed from obstructing relation to the coolant passageway 2 and eliminates any undesirable pressures in the system 2 that might result from volumetric fluctuations of the wax.

It will be understood that the foregoing description has been made for the purposes of clearly, accurately, and concisely setting forth one embodiment this invention may take; however, it will be understood that other forms of the invention will become readily apparent to those skilled in the art within the scope of the appended claims.

What is claimed is:

1. In a device of the class described, an engine of coolant system having fluid containing branches in communication with one another, an engine coolant outlet in communication with one branch, and engine coolant inlet in communication with a second branch, and a cooling source in communication with a third branch, and a return branch communicating the cooling medium with the inlet, a bypass valve within the second branch and a cooling source valve within the third branch and each of the valves being in fluid obstructing relation within their respective branches from closed to open position, and linkage external to said branches and being so arranged and interconnected with the valves as to permit one valve to be substantially open when the other valve is substantially closed, and thermal responsive means external to and in unobstructing fluid relation with the coolant system and operatively connected with the linkage for opening the cooling source valve for passing the fluid through the coolant source consequent upon overheating of the fluid, said thermal responsive means including a thermostatic element having material expandable in response to temperature increase for actuating said linkage, and fluid conduit means communicating between the one branch and the element and being of such small size as to avoid obstructing the flow of fluid in the branches.

2. In a device of the class described, an engine of coolant system having fluid containing branches in communication with one another, an engine coolant outlet in communication with one branch, an engine coolant inlet in communication with a second branch, and a cooling source in communication with a third branch, and a return branch communicating the cooling medium with the inlet, a bypass valve within the second branch and a cooling source valve within the third branch and each of the valves being in fluid obstructing relation within their respective branches from closed to open position, and linkage external to said branches and being so arranged and interconnected with the valves as to permit one valve to be substantially open when the other valve is substantially closed, and thermal responsive means external to and in unobstructing fluid relation with the coolant system and operatively connected with the linkage for opening the cooling source valve for passing the fluid through the coolant source consequent upon overheating of the fluid, and spring return means operatively connected to the linkage for closing the cooling source valve consequent upon cooling of the fluid.

3. In a device of the class described, an engine of coolant system having fluid containing branches in communication with one another, an engine coolant outlet in communication with one branch, an engine coolant inlet in communication with a second branch, and a cooling source in communication with a third branch, and a return branch communicating the cooling medium with the inlet, a bypass valve within the second branch and a cooling source valve within the third branch and each of the valves being in fluid obstructing relation within their respective branches from closed to open position, and linkage external to said branches and being so arranged and interconnected with the valves as to permit one valve to be substantially open when the other valve is substantially closed, and thermal responsive means external to and in unobstructing fluid relation with the coolant system and operatively connected with the linkage for opening the cooling source valve for passing the fluid through the coolant source consequent upon overheating of the fluid, and abutment means without at least one of the branches for limiting the opened and closed positions of at least one of the valves.

4. A cooling system containing a fluid coolant for an internal combustion engine having an inlet and outlet and a heat exchanger therefor, the combination a tri-leg coolant housing including a main leg connected with the engine outlet, a second leg connected with the heat exchanger and a third leg connected with the engine inlet, a common juncture between said legs providing a zone of high heat radiation, first and second valves disposed within the second and third legs substantially an equal distance from the juncture of said legs, linkage mounted externally of the fluid within the housing and interconnecting said valves to simultaneously move one valve toward an open position as the other moves to a closed position, and a thermostatic unit operatively connected to the linkage and mounted externally the fluid within the housing and in thermal contact therewith and operable in response to temperature increase to proportionally increase the flow of fluid to the heat exchanger and proportionally decrease the flow of bypass fluid to the engine, said unit being disposed in heat change relation to said juncture whereby said unit is conditioned for ready response to small thermal variations.

5. A cooling system containing a fluid coolant for an internal combustion engine having an inlet and outlet and a heat exchanger therefor, the combination a tri-leg coolant housing including a main leg connected with the engine outlet, a second leg connected with the heat exchanger and a third leg connected with the engine inlet, a common juncture between said legs providing a zone of high heat radiation, first and second valves disposed within the second and third legs, linkage mounted externally of the fluid within the housing and interconnecting said valves to simultaneously move one valve to an open position as the other moves to a closed position, and a thermostatic unit operatively connected to the linkage and mounted externally the fluid within the housing and in thermal contact therewith and operable in response to temperature increase to proportionately increase the flow of fluid to the heat exchanger and proportionally decrease the flow of bypass fluid to the engine, said unit being disposed in heat change relation to said juncture whereby said unit is conditioned for ready response to small thermal variations.

References Cited in the file of this patent

UNITED STATES PATENTS

| | | |
|---|---|---|
| 1,528,788 | Rayfield | Mar. 10, 1925 |
| 1,935,118 | Giesler | Nov. 14, 1933 |
| 2,336,068 | Charles | Dec. 7, 1943 |